(12) United States Patent
Hino et al.

(10) Patent No.: US 8,125,980 B2
(45) Date of Patent: Feb. 28, 2012

(54) USER TERMINAL CONNECTION CONTROL METHOD AND APPARATUS

(75) Inventors: Masayuki Hino, Yokohama (JP);
Hiroaki Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1210 days.

(21) Appl. No.: 11/282,712

(22) Filed: Nov. 21, 2005

(65) Prior Publication Data
US 2006/0109839 A1    May 25, 2006

(30) Foreign Application Priority Data
Nov. 22, 2004    (JP) .................................. 2004-337273

(51) Int. Cl.
*H04L 12/66* (2006.01)
(52) U.S. Cl. ..................... 370/352; 370/230; 370/395.2; 370/430
(58) Field of Classification Search ......................... None
See application file for complete search history.

(56) References Cited

U.S. PATENT DOCUMENTS

| | | | | |
|---|---|---|---|---|
| 6,563,821 | B1 * | 5/2003 | Hong et al. ................... | 370/389 |
| 2002/0129271 | A1 * | 9/2002 | Stanaway et al. ............. | 713/201 |
| 2006/0010215 | A1 * | 1/2006 | Clegg et al. ................... | 709/206 |

FOREIGN PATENT DOCUMENTS

| | | |
|---|---|---|
| JP | 11-205388 | 7/1999 |
| JP | 2000-112852 | 4/2000 |
| JP | 2003-016031 | 1/2003 |
| JP | 2003-16031 | 1/2003 |
| JP | 2003-348282 | 12/2003 |
| JP | 2004-289723 | 10/2004 |
| JP | 2004-304824 | 10/2004 |

* cited by examiner

*Primary Examiner* — Melanie Jagannathan
*Assistant Examiner* — Justin N Mullen
(74) *Attorney, Agent, or Firm* — Antonelli, Terry, Stout & Kraus, LLP.

(57) ABSTRACT

A user terminal connection control method to limit the number of sessions simultaneously connectable to the Internet, wherein an access server or authentication server has a user management table for specifying the maximum number of connections and a preferential terminal identifier indicating a user terminal to be preferentially connected to the Internet for each group comprising a plurality of user identifiers. The access server or authentication server determines, during a communication procedure for authenticating a user who requests to access to the Internet, whether the current number of connections for a group to which the user belongs has reached the maximum number of connections, and if so, determines whether to allow the user terminal to connect to the Internet depending on whether the user terminal identifier matches the preferential terminal identifier.

7 Claims, 10 Drawing Sheets

ROUTING TABLE 13

| DESTINATION IP ADDRESS ~141 | OUTPUT PORT NUMBER ~142 | OUTPUT LINK INFORMATION ~143 | DESTINATION MAC ADDRESS ~144 |
|---|---|---|---|
| 192.168.1.1 | 1 | ppp sessionID 1 | 00:11:11:11:11:11 |
| 192.168.1.2 | 1 | ppp sessionID 2 | 00:11:22:33:44:55 |
| 192.168.2.1 | 1 | ppp sessionID 3 | 00:22:33:44:55:66 |
| 192.168.3.1 | 2 | ppp sessionID 4 | 00:33:33:33:33:33 |
| ⋮ | ⋮ | ⋮ | ⋮ |

FIG. 4

AUTHENTICATION SERVER 40

FIG. 5

USER MANAGEMENT TABLE 56

| GROUP NUMBER 561 | USER ID 562 | PASSWORD 563 | IP ADDRESS 564 | PREFERENTIAL MAC ADDRESS 565 | MAXIMUM NUMBER OF CONNECTIONS 567 | CURRENT NUMBER OF CONNECTIONS 568 |
|---|---|---|---|---|---|---|
| 1 | user1-1@isp1 | PW (user1) | 192.168.1.1 | 00.11.22.33.44.55 | Max (1) | 2 |
|  | user1-2@isp1 |  | 192.168.1.2 |  |  |  |
|  | ... |  | ... |  |  |  |
| 2 | user2-1@isp1 | PW (user2) | 192.168.2.1 |  | Max (2) | 1 |
|  | ... |  | ... |  |  |  |
| 3 | user3-1@isp1 | PW (user3) | 192.168.3.1 | 00.22.33.44.55.66 | Max (3) | 1 |
|  | user3-2@isp1 |  | — |  |  |  |
|  | ... |  | ... |  |  |  |
| 4 | user4-1@isp1 | PW (user4) | — |  | Max (4) | 0 |
|  | ... |  | ... |  |  |  |

Access-Accept

USER TERMINAL CONNECTION CONTROL
METHOD AND APPARATUS

CLAIM OF PRIORITY

The present application claims priority from Japanese patent application serial No. 2004-337273, filed on Nov. 22, 2004, the content of which is hereby incorporated by reference into this application.

BACKGROUND OF THE INVENTION (1) Field of the Invention

The present invention relates to a user terminal connection control method and apparatus for carrying out control of connecting user terminals to the Internet. More particularly, the invention relates to a packet forwarding apparatus for controlling the connection of a user terminal to an IP network after establishing a session with the user terminal in accordance with a Point to Point Protocol (PPP), and an authentication server for restricting user terminal access to the Internet.

(2) Description of Prior Art

When connecting a user terminal to the Internet via an Internet Service Provider (ISP) network managed by an Internet Connection Service Provider, an Internet Protocol (IP) address required for communication on the Internet is delivered from the ISP. In the network configuration including such an ISP network for Internet connection, an access network lies between user terminals and the ISP network.

In the access network, an access server for controlling connection/disconnection of each user terminal to the Internet or a packet forwarding apparatus called a Broadband Access Server (BAS) is located. In most cases, each user terminal is connected to the BAS by PPP over Ethernet (PPPoE), which is a technique for PPP-based connection on Ethernet. In standard Internet connection services, one IP address is delivered to every user. In this case, each user is allowed to connect only one terminal to the Internet at a time.

To enable a user to connect multiple terminals to the Internet using one IP address delivered to the user, it is needed to make the multiple terminals share the IP address by applying an address translation technique such as Network Address Translation (NAT) or IP Masquerade, using a device such as, for example, a broadband router. However, when the NAT or IP Masquerade is applied, a specific communication procedure may be required or types of usable applications may be restricted. Some ISPs offer an additional service of delivering multiple IP addresses to one user so that the user can connect multiple terminals to the Internet at the same time.

Since an access network is generally built as an Ethernet network which is a broadcast type network, it is relatively easy to attach user terminals to the network. Therefore, the ISP usually limits the number of connections to the Internet for each user in order to prevent unauthorized user access and to make effective use of network resources such as IP addresses and communication bandwidths.

Limitation of the number of connections for each user in PPPoE-based Internet connection environment is traditionally performed within an access network, in particular, at a Layer 2 (L2) switch located between user terminals and the BAS. The L2 switch is able to limit the number of connections of terminals per user by referring to a Media Access Control (MAC) address of each communication packet, for example, as described in Japanese Unexamined Patent Publication No. 2000-112852 (patent document 1).

The L2 switch described in the patent document 1 registers, for all packets it received, entry information indicating the correspondence of a source MAC address to a receiving port into a MAC address table and determines, by referring to this table, a forwarding destination port for each packet that will be received subsequently. According to the patent document 1, the L2 switch limits the number of user terminals connectable to the Internet at the same time, by deleting entry information for which no new packet having the registered MAC address has been received within a pre-specified period of aging time, from the MAC address table, and by limiting the number of entries (MAC addresses) allowed to be registered into the table for each port.

More specifically, the L2 switch limits the number of connections (MAC addresses) enabling communications at the same time for each port by stopping, when the number of entries for a specific port registered in the MAC address table has reached a predetermined upper limit, registering a new entry to the MAC address table (learning function) with respect to a packet having a new MAC address which will be received thereafter through the specific port and by discarding all subsequent incoming packets each having an unlearned MAC address for which the MAC address table has no entry.

As a prior art technique for limiting the number of connection terminals, for example, Japanese Unexamined Patent Publication No. 2003-16031 (patent document 2) proposes a connection control scheme for limiting the number of clients simultaneously connectable to a server in a client-server system using a TCP/IP protocol. According to the scheme described in the patent document 2, a priority table indicating the relation between the IP address of each client and connection priority level is equipped in a server to which clients may connect. When a connection request from a new client occurs in the state where the number of clients connected to the server has reached the upper limit, the server compares the connection priority level of the requester client to the lowest priority level among the clients already being connected to the server in the priority table. If the connection priority level of the requester client is higher, the server disconnects a session for one of the clients having the lowest priority level and accepts the new connection request. Otherwise, the server rejects the new connection request.

However, in the case of limiting the number of connections based on the MAC address, since the L2 switch regards multiple PPP sessions connected to the same user terminal as one connection, the number of PPP sessions cannot be limited. Further, this control scheme cannot limit such a terminal that is connected to the Internet via another L2 switch by a roaming user. In the control scheme that deletes a registered MAC address according to the aging time as described in the patent document 1, a user terminal that requests an urgent connection is unable to get immediate access to the Internet when the MAC address table has no space for new entries.

On the other hand, in the control scheme in which connection priority levels are assigned to all IP addresses and a lowest priority session being active is deleted when a new connection request occurs in the state where the number of connections has reached the upper limit as described in the patent document 2, such problems would occur that time is required to make a priority decision between the new connection request and existing connections and steady communication services cannot be provided to users because lowest priority sessions are often forcibly disconnected.

SUMMARY OF THE INVENTION

An object of the present invention is to provide a user terminal connection control method and apparatus capable of limiting the number of sessions simultaneously connectable to the Internet for each user and reducing the frequency of forcible disconnection of sessions.

To achieve the above object, the present invention is characterized in that, during a communication procedure for authenticating a user who requests to access to the Internet, either a packet forwarding apparatus operating as an access sever or an authentication server connected to an ISP network determines, using a user management table in which the maximum number of connections simultaneously connectable to the Internet and a preferential terminal identifier indicating a user terminal to be preferentially connected to the Internet are specified for each group comprising a plurality of user identifiers, whether the current number of connections for a group to which the requester user belongs has reached the maximum number of connections, and if so, determines whether to allow the user terminal to connect to the Internet depending on whether the user terminal identifier matches the preferential terminal identifier.

Even if the user has been authenticated successfully, unless the user terminal identifier is registered as the preferential terminal identifier, the access to the Internet is rejected when the current number of connections has reached the maximum number of connections within the group. When the user terminal identifier is registered as the preferential terminal identifier, the access to the Internet is allowed after disconnecting a session with one of access allowed user terminals within the same group.

In the case where the user management table is equipped in the authentication server, a response message transmitted from the authentication server to the access server includes, besides a result of normal user authentication based on a password, a result of comparison between the current number of connections and the maximum number of connections for the group to which the user belongs, and a result of determination as to whether the user terminal is the preferential terminal. If the authentication server allows the user terminal to access to the Internet, an IP address to be used by the user terminal is specified in the response message.

If the user management table is equipped in the access server (packet forwarding apparatus), the packet forwarding apparatus decides a response to be returned to the user terminal by comparing the current number of connections and the maximum number of connections within the group to which the user belongs and determining whether the user terminal is the preferential terminal when a response message indicating successful authentication is received from the authentication server.

According to the present invention, since the access server or the authentication server limits the number of connections to the Internet for each group comprising a plurality of user identifiers, limitation of the number of connections can be implemented consistently with access in static situations even if a roaming user requests to access to the Internet via another L2 switch. By registering a user terminal identifier that is preferentially allowed to connect to the Internet in each group, the registered user terminal in each group can be allowed to connect to the Internet immediately even if the current number of connections has reached the maximum number of connections for the group. In that event, any session having been established is disconnected, but this disconnection occurs with one of the terminals belonging to the same group including the preferential user terminal and, therefore, this disconnection has no effect on the user terminals belonging to other groups.

DETAILED DESCRIPTION OF THE PREFERRED EMBODIMENTS

First Embodiment

Figure 1:
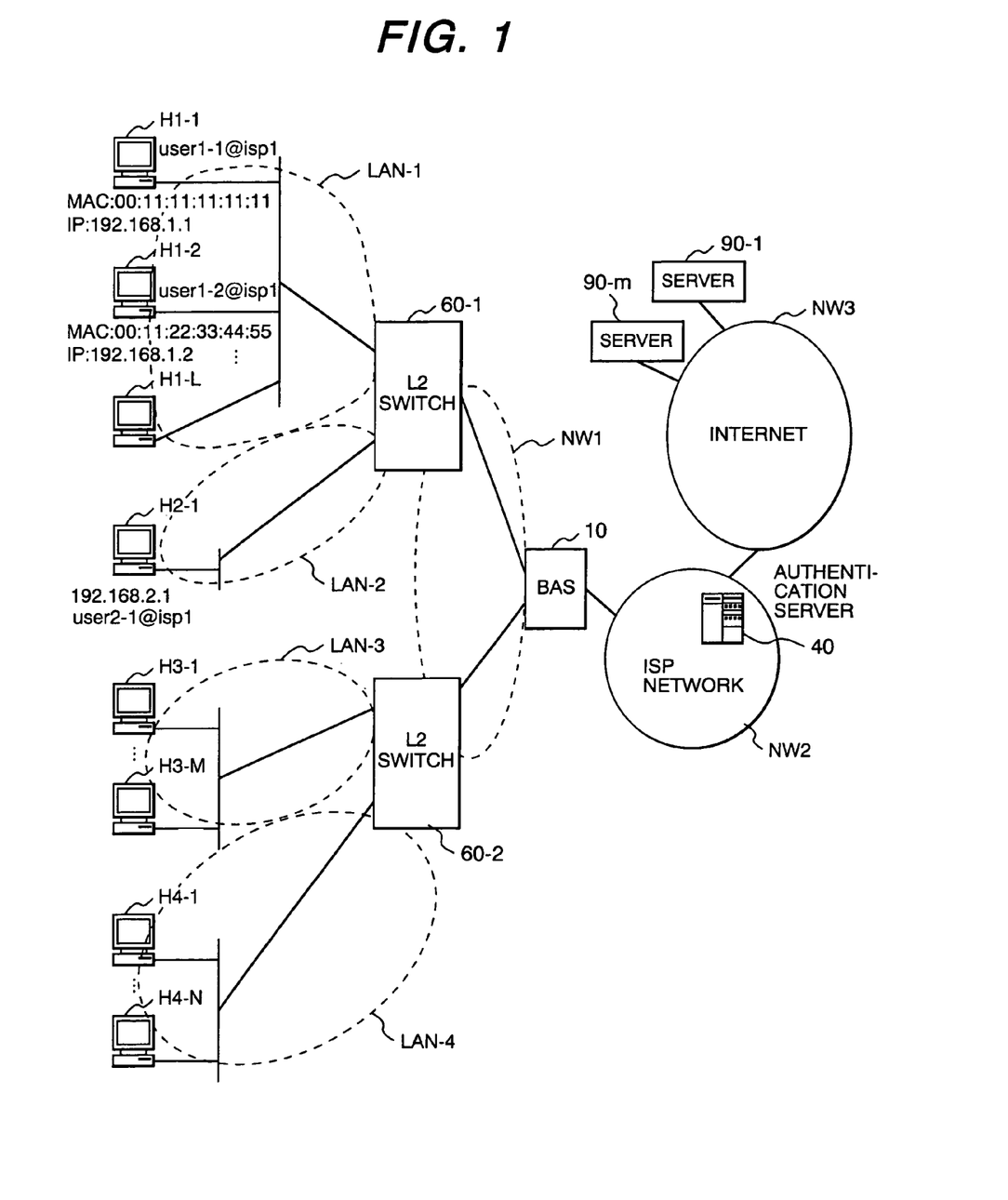
FIG. 1 shows an example of a configuration of a communication network system to which the present invention is applied.

FIG. 1 shows an example of a configuration of a communication network system to which the present invention is applied.

The communication network system shown here is comprised of an access network NW1 including a packet forwarding apparatus (hereinafter referred to as a broadband access server: BAS) 10 and a plurality of L2 switches 60 (60-1, 60-2), an ISP network NW2 managed by an ISP, and the Internet NW3.

Each L2 switch accommodates a plurality of LANs (LAN-1 to LAN-4) and one or a plurality of user terminals H (H1-1 to H1-L, H2-1, H3-1 to H3-M, and H4-1 to H4-N) are connected to each LAN. These user terminals H are connected to the broadband access server (BAS) 10 through PPP over Ethernet (PPPoE) via the L2 switch 60 and get access to any server 90 (90-1 to 90-*m*) on the Internet NW3 via the BAS 10 and the ISP network 2.

To the ISP network NW2, a subscriber authentication server (hereinafter simply referred to as an authentication server) is connected. The authentication server manages user information such as user ID, password, address, name, and account number for each user registered beforehand. In the present embodiment, user terminals H are grouped by LAN and a plurality of user terminals belonging to the same group use a common password for user authentication.

When one of user terminals H establishes a PPP session with the BAS 10 via an L2 switch 60, the BAS 10 requests the user terminal to send authentication data. Upon receiving authentication data including a user ID and a password from the user terminal, the BAS 10 transmits an authentication request message including the user ID and the password to the authentication server 40.

Upon receiving the authentication request from the BAS 10, the authentication server 40 refers to user information relevant to the user ID received, checks validity of the password submitted by the user (user authentication), and returns an authentication result to the BAS 10. According to the response result from the authentication server 40, the BAS 10 determines whether the user terminal should be allowed to connect to the Internet.

For communication between the BAS, 10 and the authentication sever 40, for example, a Remote Authentication Dial In User Service (RADIUS) protocol is used. The authentication server that operates according to the RADIUS protocol is generally called a RADIUS server. In the embodiment, as will be described hereinafter, the authentication server 40 is provided with the function of managing accounting information for each Internet user.

Figure 2:
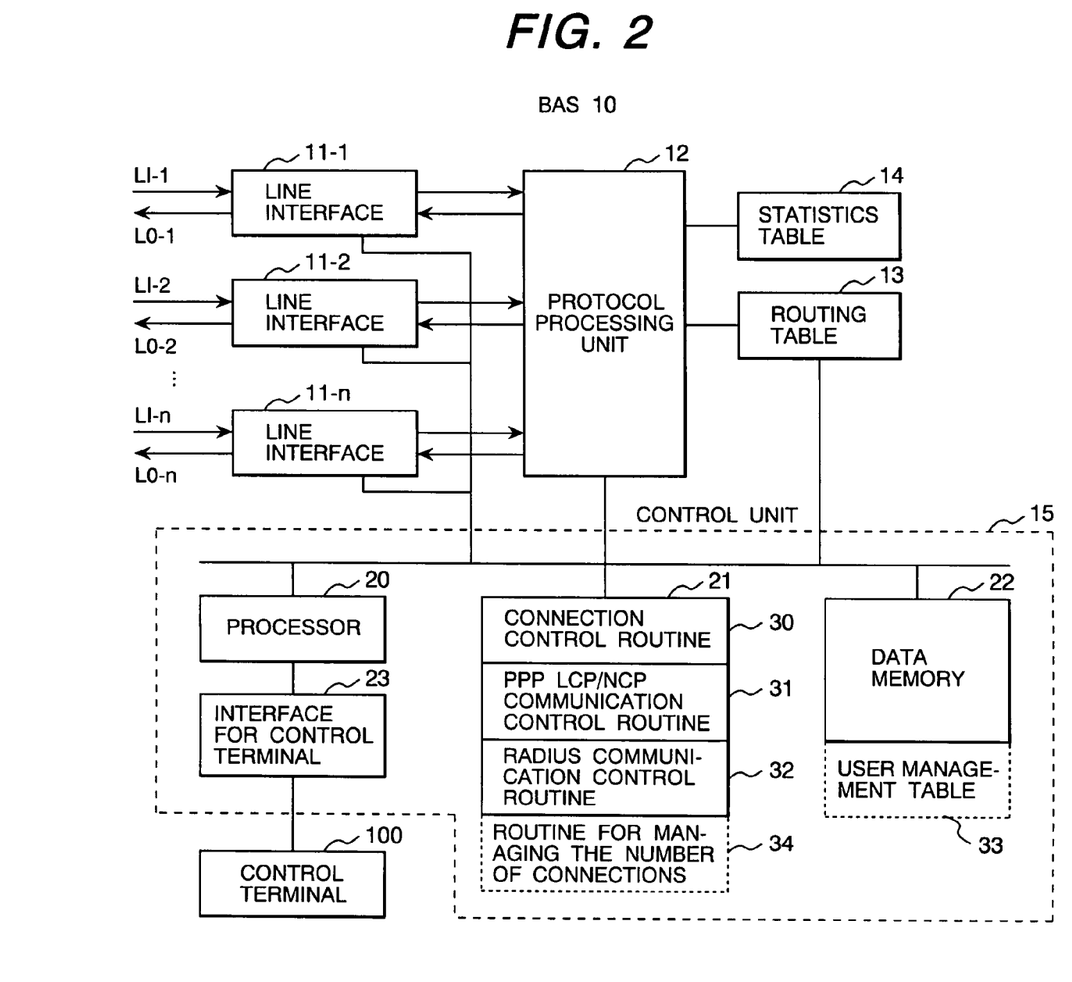
FIG. 2 shows an example of a structure of a packet forwarding apparatus (BAS 10 in FIG. 1) of the present invention.

FIG. 2 is a block diagram showing an embodiment of the broadband access server (BAS) 10.

The BAS 10 is comprised of a plurality of line interfaces 11 (11-1 to 11-*n*) connected to input and output lines LI-i, LO-i (where i=1 to n and n is a positive integer) for communicating with the L2 switches or the ISP network NW2 and a protocol processing unit 12 and a control unit 15 connected to these input/output interfaces.

The protocol processing unit 12 takes in a packet (or frame) that a line interface 11-*i* received from an input line LI-i, refers to a routing table 13 based on the destination address extracted from the header of the received packet, and transfers the received packet to one of line interfaces or the control unit 15 corresponding to the destination address. The protocol processing unit 12 collects statistics information required for accounting for each PPP connection accessing to the Internet and stores the information into a statistics table 14. Accounting information stored in the statistics table 14 is reported to the authentication server 40 periodically and when a PPP connection is disconnected.

The control unit 15 is comprised of a processor 20, a memory 21 for storing various kinds of programs to be executed by the processor 20, a memory 22 for storing data and tables, and a terminal interface 23 for connection to a control terminal 100.

In the memory 21, a connection control routine 30, PPP LCP/NCP communication control routine 31, and a RADIUS communication control routine 32 for communication with the authentication server 40 are stored as programs related to the present invention. The connection control routine 30 performs overall control of a communication sequence between a user terminal and the authentication server, which will be described later by referring to FIG. 6, instruction to the protocol processing unit 12 to start and stop collecting statistics information, periodical reporting of statistics information to the authentication server, and other control operations. A user management table 33 shown in a dotted block in the memory 22 and a routine for managing the number of connections 34 shown in a dotted block in the memory 21 relate to only a second embodiment of the present invention which will be described later and, therefore, their explanation is omitted here.

Figure 3:
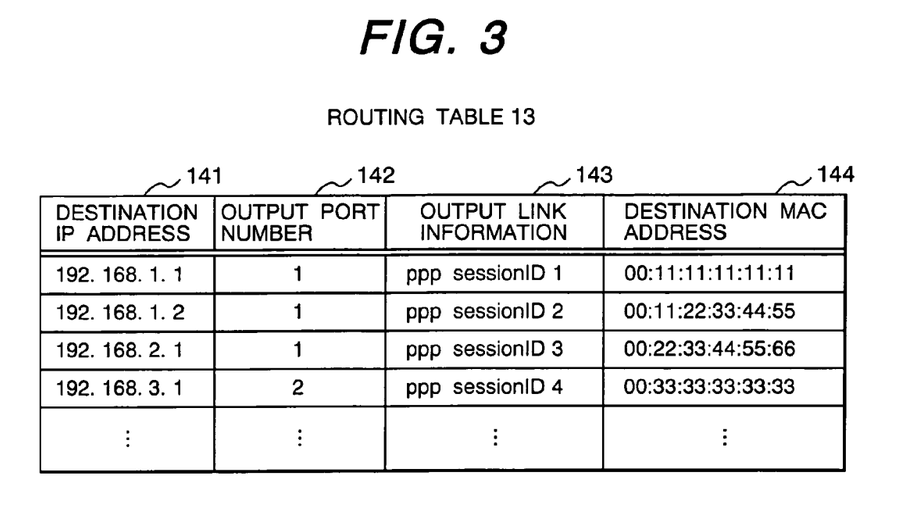
FIG. 3 shows an example of a routing table to be equipped in the packet forwarding apparatus of the present invention.

FIG. 3 shows an embodiment of a routing table 13 to be updated by the control unit 15 and referred to by the protocol processing unit 12.

The routing table 13 stores a plurality of table entries each indicating the relation between a destination IP address 141 and an output port number 142. Each entry, in which an IP address assigned from the authentication server 40 to a user terminal having been authenticated successfully is registered as the destination IP address 141, further includes output link information 143 and a destination MAC address 144. Each entry is registered into the routing table 14 when the BAS 10 delivers the IP address to the user terminal having been authenticated successfully and deleted from the routing table 14 when the PPP session of the user terminal is released.

Figure 4:
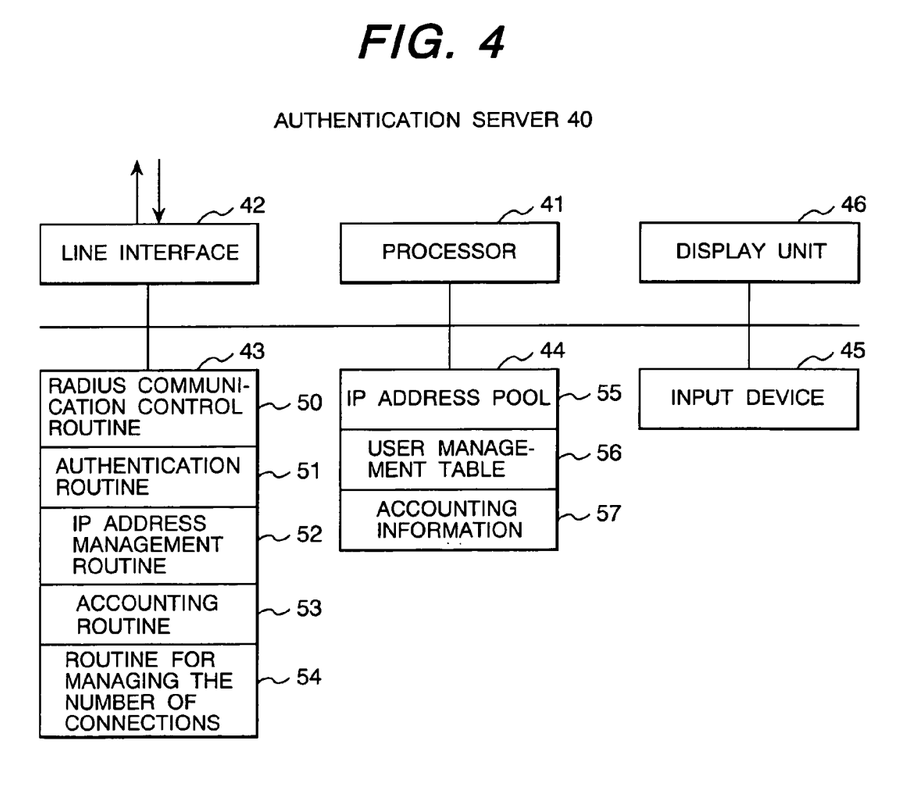
FIG. 4 is a block diagram showing an embodiment of an authentication server 40.

FIG. 4 is a block diagram showing an embodiment of the authentication server 40.

The authentication server 40 is comprised of a processor 41, a line interface 42 for connection to the ISP network NW2, a memory 43 for storing various kinds of programs to be executed by the processor 41, a memory 44 for storing tables and data that the processor 41 uses, and an input device 45 and a display unit 46 as interfaces between the authentication server 40 and an administrator.

Figure 7:
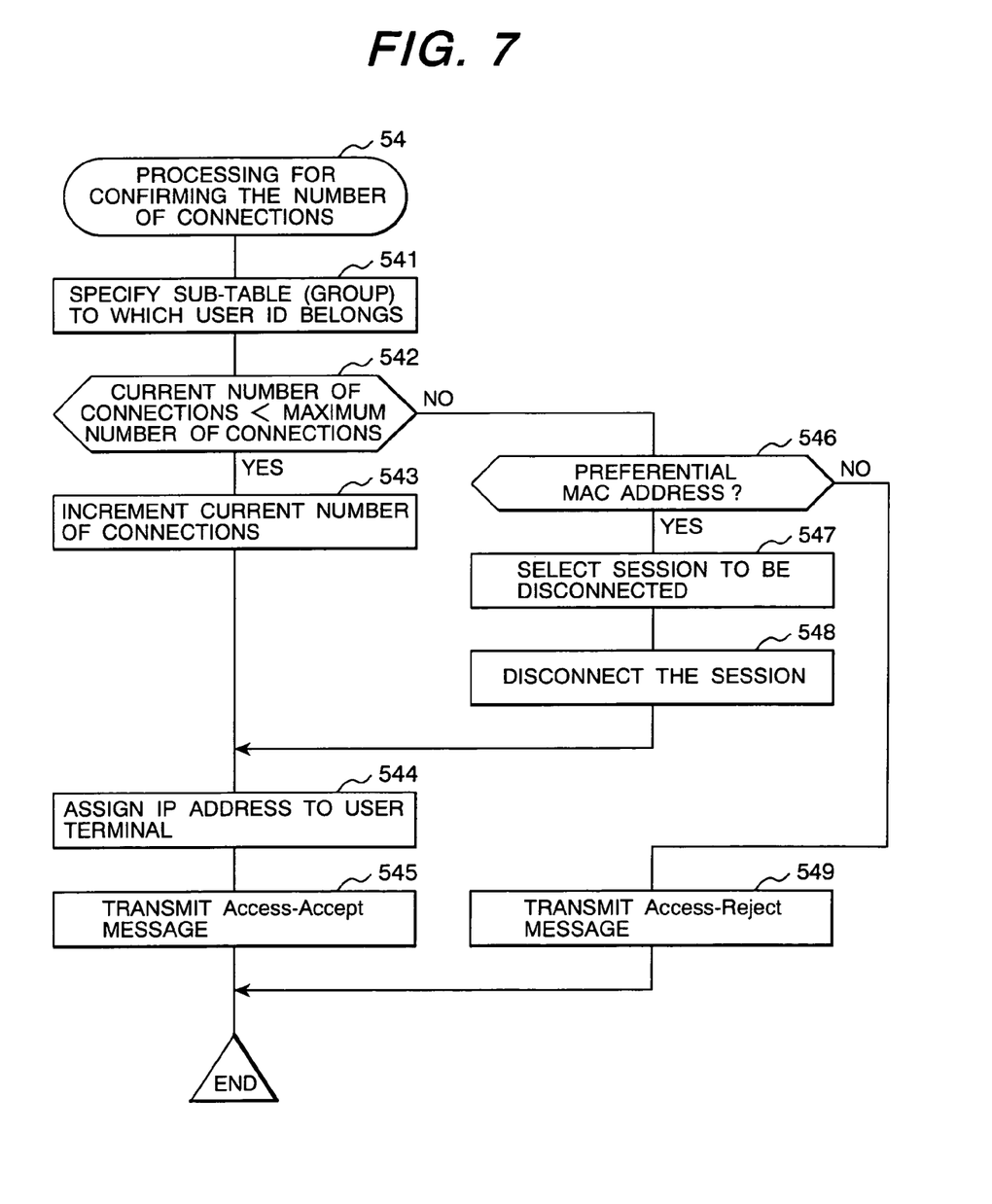
FIG. 7 is a flowchart illustrating an embodiment of a processing for confirming the number of connections 54, which is performed by the authentication server.

In the memory 43, a RADIUS communication control routine for communicating with BAS 10 in accordance with the RADIUS protocol, an authentication routine 51 for authenticating users, an IP address management routine 52 for retrieving an IP address to be assigned to a user terminal from an address pool and storing a released IP address back to the address pool as an idle address, an accounting routine 53, and a routine for managing the number of connections 54, which will be detailed by referring to FIG. 7 as processing for confirming the number of connections, are stored as programs related to the present invention. In the memory 44, an IP address pool 55, a user management table 56, and an accounting information file 57 are formed.

Figure 5:
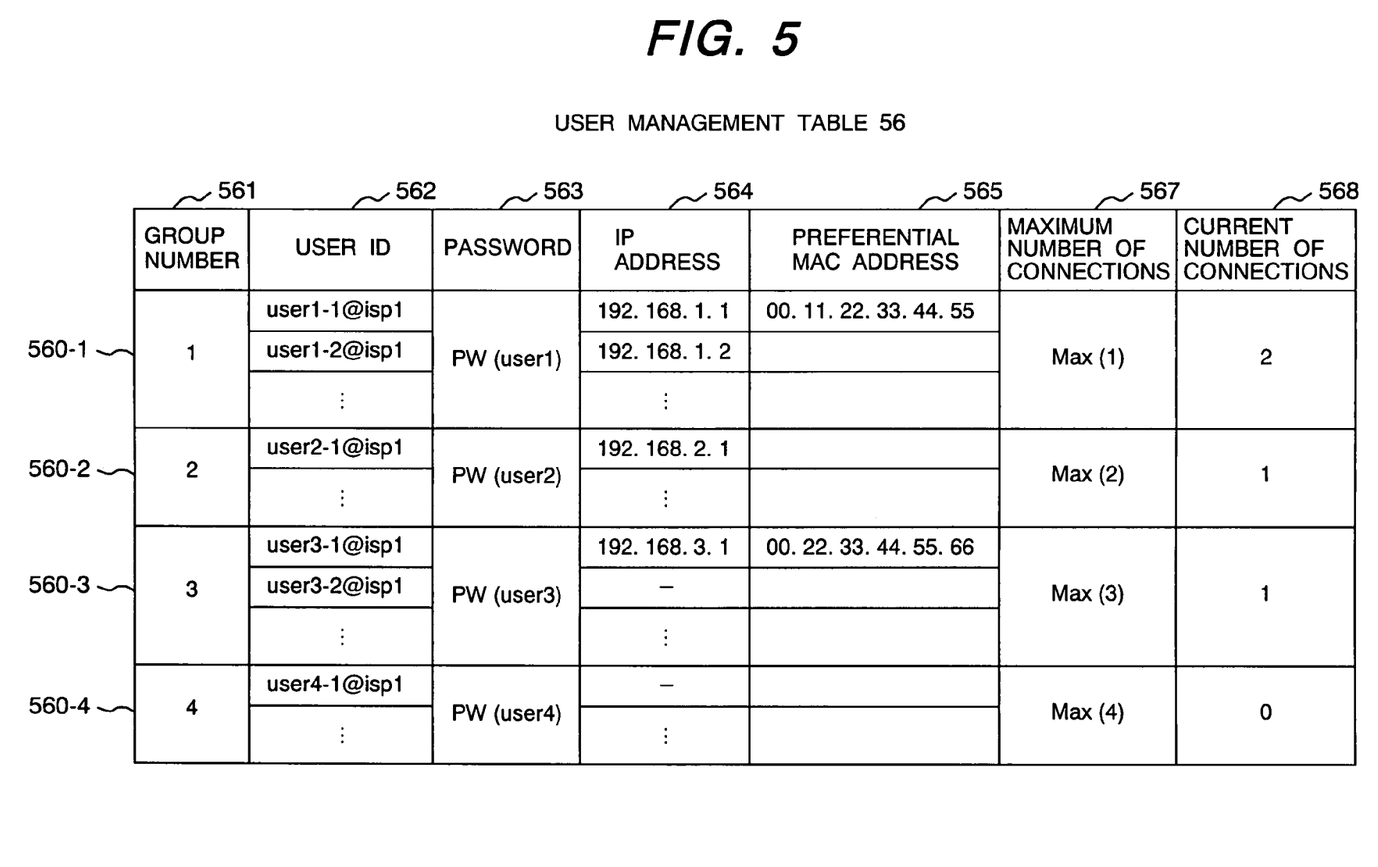
FIG. 5 shows an example of a user management table to be equipped in the authentication server.

FIG. 5 shows an embodiment of the user management table 56 to be equipped in the authentication server 40.

The user management table 56 is comprised of a plurality of subtables 560 (560-1, 560-2, . . . ) having group numbers 561. Each subtable 560 includes, as user information, user IDs 562, a password 563, IP addresses 564, and other personal information (not shown) and, besides, includes a preferential MAC address 565, maximum number of connections 567, and current number of connections 568.

Here, the user ID 562 indicates an identifier of user who belongs to a group having the group number 561 and the password 563 indicates a password to be used in common for the multiple users in the group when user authentication is performed. The IP address 564 indicates an IP address assigned to the user by the authentication server 40. The IP address is stored in the entry of a user who is connecting a PPP session. The preferential MAC address 565 indicates the MAC address of a user terminal that should be preferentially connected to the Internet NW3. The maximum number of connections 567 indicates the number of sessions allowed to simultaneously connect to the Internet NW3, which is predetermined by contract for each group. The current number of connections 568 indicates the number of sessions being connected to the Internet NW3 in each group.

Although the upper limit of the number of addresses that can be registered as preferential MAC addresses 565 is equal to the maximum number of connections 567, it is limited to a smaller number in practical application. As other personal information, for example, information about time when the last communication took place between a user and a server 90 being connected with a PPP session and information such as the total number of packets that the user terminal has transmitted to and received from the server 90 is stored in the table.

These information items are obtained from statistics information that the authentication server 40 periodically receives from the BAS 10.

Figure 6:
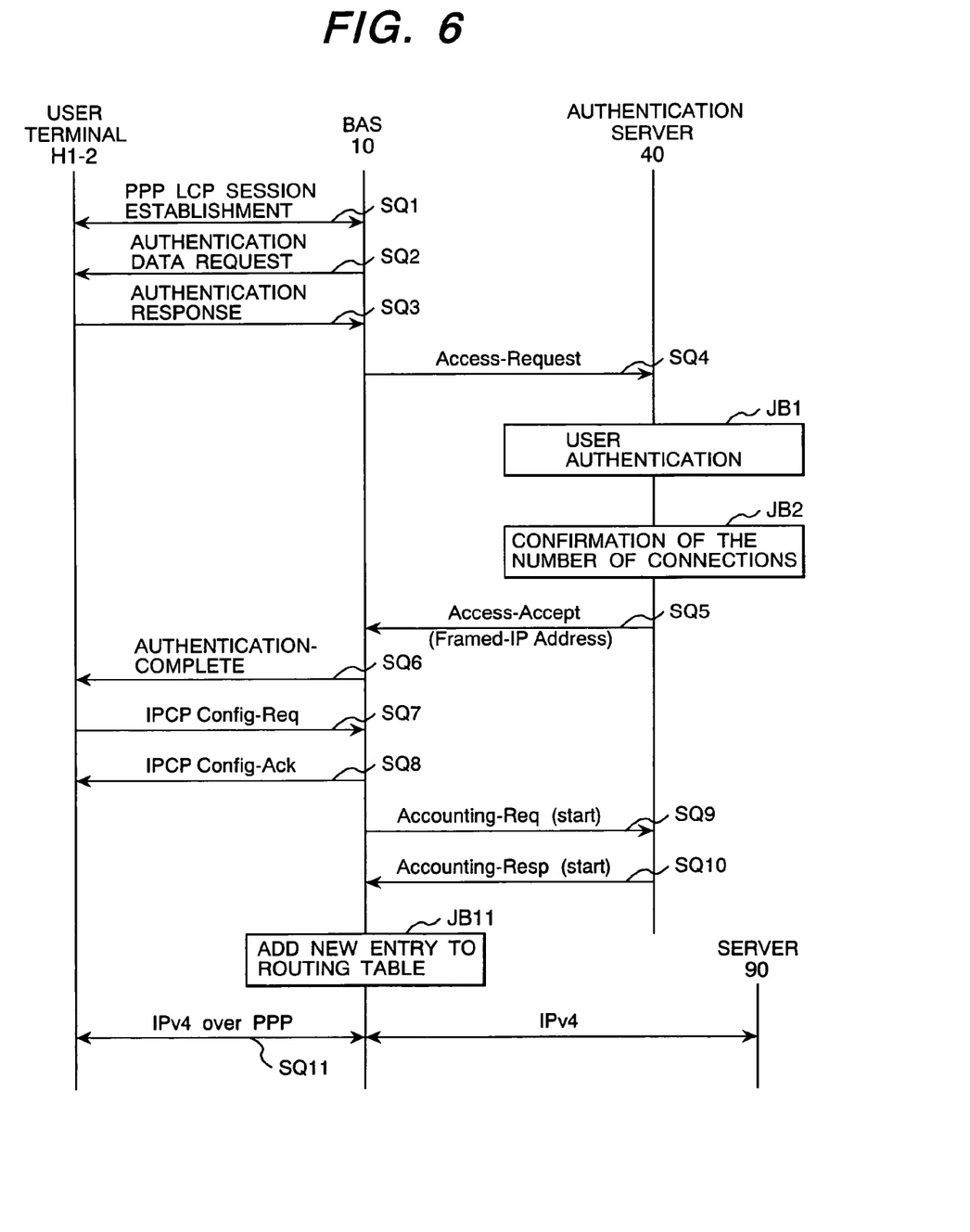
FIG. 6 shows a first embodiment of a communication sequence that is initiated when a request for connection to the Internet is issued from a user terminal to the BAS.

Next, by referring to FIG. 6, a communication sequence will described in the case where one of user terminals H shown in FIG. 1, for example, the user terminal H1-2 having user ID "user1-2@isp1" and MAC address "00:11:22:33:44:55" issues a request for connection to the Internet to the BAS 10, using Point to Point Protocol (PPP).

The user terminal H1-2 establishes a PPP LCP session with the BAS 10 in accordance with a normal connection sequence of PPP (SQ1). The PPP LCP session is established by transmitting a PPP LCP Configure-Request from the user terminal H1-2 to the BAS 10 and by returning a PPP LCP Configure-Response from the BAS 10 to the user terminal H1-2 in response to the request.

Having established the PPP LCP session, the BAS 10 requests the user terminal H1 to send a user ID and password as authentication data in order to determine whether the user terminal H1-2 is authorized to connect to the Internet (SQ2). When the user terminal H1-2 transmits an authentication response message including the user ID and password (SQ3) in response to the request, the BAS 10 transmits an access request message "Access-Request" including the user ID "user1-2@isp1" and password PW "user1" received from the user terminal H1-2 to the authentication server 40 managed by the ISP. In the present embodiment, the access request message includes the MAC address "00:11:22:33:44:55" of the user terminal H1-2 as additional information.

Upon receiving the access request message "Access-Request", the authentication server 40 searches the user management table 56 for an entry corresponding to the user ID "user1-2@isp1" indicated in the received message and compares the password indicated in the received message with the password 563 previously registered in the entry retrieved from the table (user authentication JB1). A feature of the present embodiment resides in that, if having verified the validity of the user terminal H1-2, the authentication server 40 executes processing for confirming the number of connections (JB2) in order to compare the maximum number of connections and the current number of connections for a group to which the user ID belongs and determine whether an additional connection is allowed.

In the processing for confirming the number of connections (JB2), as shown in detail in FIG. 7, the processor 41 refers to the user management table 56 using the user ID indicated in the access request message "Access-Request" as a search key and specifies a subtable (a subtable 560-1 in this example) to which the user ID belongs (step 541). The processor 41 compares the value of the current number of connections 568 and the value Max(1) of the maximum number of connections 567 indicated in the subtable (step 542).

If the value of the current number of connections 568 is smaller than the value Max(1) of the maximum number of connections 567, the processor 41 increments the current number of connections 568 by one (step 543). Then, the processor 41 retrieves an idle IP address to be assigned to the user terminal H1-2 from the IP address pool 55 (step 544) and transmits an access request response message "Access-Response" including the IP address to the BAS 10 (step 545, SQ5 in FIG. 6).

If the current number of connections 568 has reached the maximum number of connections 567, the processor 41 checks whether the MAC address of the user terminal indicated in the access request message "Access-Request" matches the preferential MAC address 565 registered in the above subtable (step 546). If the MAC address of the user terminal is not registered as the preferential MAC address, the processor 41 generates a response message "Access-Reject" indicating authentication failure and transmits the response message to the BAS 10 (step 549, SQ5 in FIG. 6).

If the MAC address of the user terminal is registered as the preferential MAC address, the processor 41 selects a user ID whose session should be disconnected forcibly from among the user IDs associated with PPP sessions established and belonging to the same group (step 547). The processor 41 requests the BAS 10 to disconnect the session for the selected user ID (step 548) and executes steps 544 and 545. The selection of PPP session to be disconnected is not restrictive. For example, a session having the longest intermission in communication with a server 90 at the time or a session smallest in the total number of communication packets may be disconnected.

Figure 8:
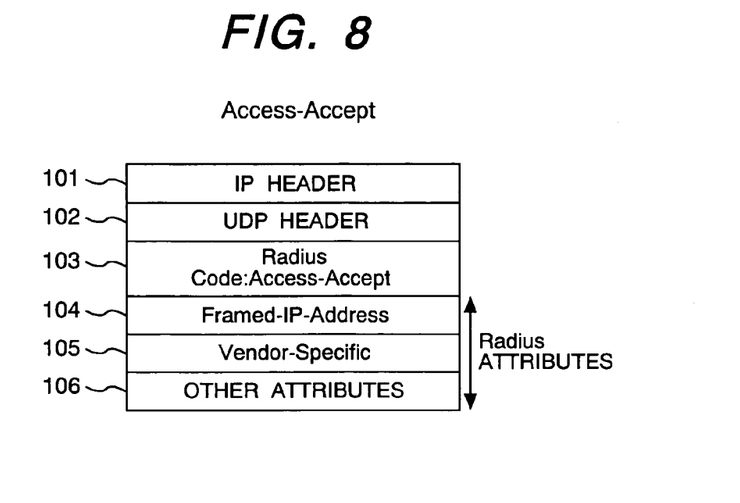
FIG. 8 shows a format of an Access-Accept message to be transmitted from the authentication server to the BAS.

The response message "Access-Accept" that the authentication server 40 sends to the BAS 10 upon successful user authentication is transmitted in the form of an IP packet in which an IP header 101 and a UDP header 102 are added to the message, for example, as shown in FIG. 8. The response message includes, as RADIUS attributes following RADIUS Code 103 indicating the message type "Access-Accept", a Framed-IP-Address attribute 104, Vendor-Specific attribute 105, and other attributes 106. In the Framed-IP-Address attribute 104, the value of the IP address ("192.168.1.2" in this example) that the authentication server 40 assigned to the user terminal H1-2 is specified.

Returning to FIG. 6, when the response message "Access-Accept" is received from the authentication server 40, the BAS 10 transmits an authentication complete notification message to the user terminal H1-2 (SQ6). If a response message "Access-Reject" indicating authentication failure is returned from the authentication server 40, the BAS 10 transmits an authentication failure notification message to the user terminal H1-2 and disconnects the PPP session with that terminal.

Upon receiving the authentication complete notification message indicating access request permission from the BAS 10, the user terminal H1-2 transmits a request "IPCP Configure-Request" for IP address assignment to the BAS 10 in accordance with an Internet Protocol Control Protocol (IPCP) (SQ7). In response to the request for IP address assignment, the BAS 10 generates an IP address delivery message "IPCP Configure-Acknowledgement" including the IP address which has already been received from the authentication server 40 and returns the message to the user terminal H1-2 (SQ8).

After that, the BAS 10 transmits an accounting start request message "Accounting-Request (start)" to the authentication server 40 (SQ9). Upon receiving an accounting start response message "Accounting-Response (start)" from the authentication server (SQ10), the BAS 10 adds a new table entry for a destination IP address "192.168.1.2" into the routing table 13 (JB11) and the protocol processing unit 12 starts the collection of statistics data for accounting for packets with the source ID address "192.168.1.2". Then, the BAS starts forwarding the packets for accessing the Internet NW3 from the user terminal H (SQ11).

Figure 9:
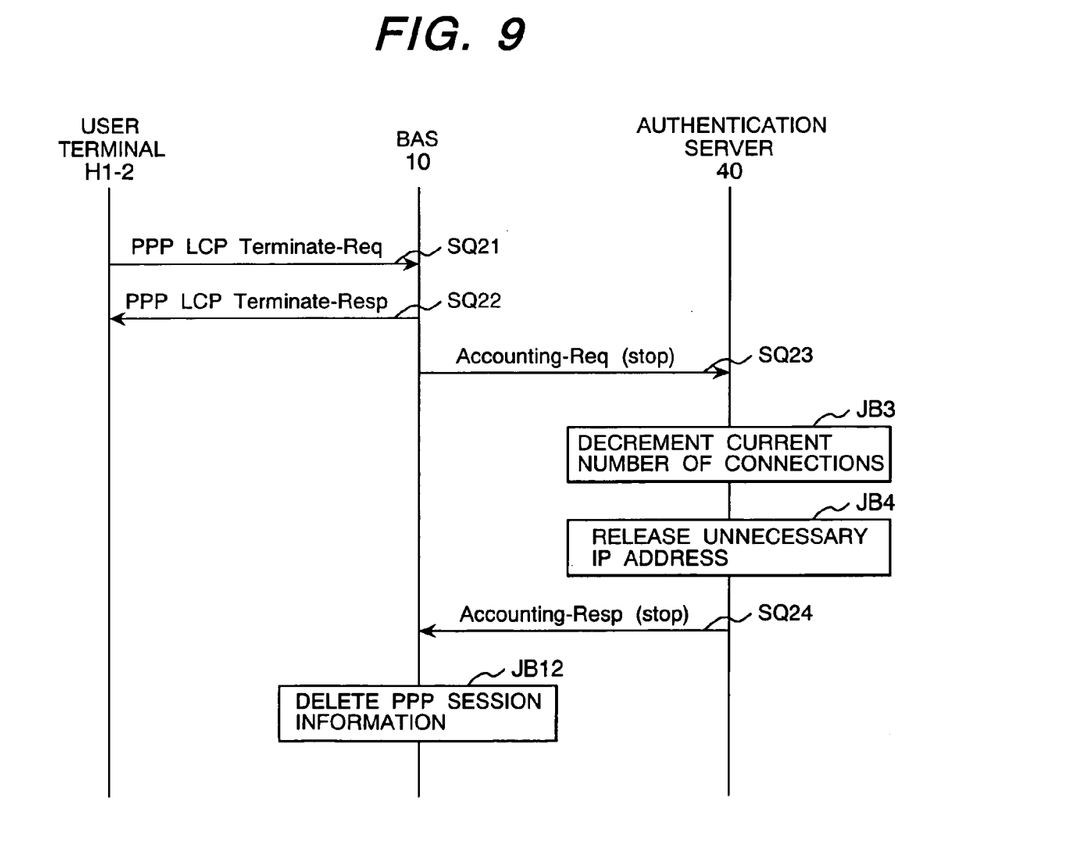
FIG. 9 shows a first embodiment of a communication sequence that is initiated when a disconnection request is issued from the user terminal to the BAS.

FIG. 9 shows a PPP session disconnection sequence.

When the user issues a command to disconnect an Internet connection, the user terminal H1-2 transmits a PPP LCP session disconnection request message "PPP LCP Terminate-Request" to the BAS 10 (SQ21). Upon receiving the disconnection request message, the BAS 10 returns a response message "PPP LCP Terminate-Response" to the user terminal H1-2 (SQ22) and transmits an accounting stop request message "Accounting-Request (stop)" for the user ID "user1-2@isp1" to the authentication server 40 (SQ23). The accounting stop request message includes the statistics data on the user terminal H1-2 collected by the protocol processing unit 12.

Having received the accounting stop request message, the authentication server 40 refers to the user management table 56, decrements by one the value of the current number of connections 568 in the subtable 560-1 to which the specified user ID "user1-2@isp1" belongs (JB3), and releases the IP address having become useless back to the address pool 44 (JB4). Then, the authentication server 40 transmits an accounting stop response message "Accounting-Response (step)" to the BAS 10 (SQ24). Upon receiving the accounting stop response message from the authentication server 40, the BAS 10 deletes the information relevant to the disconnected PPP session from the routing table (JB12).

Second Embodiment

While the limitation of the number of connections by group is performed on the authentication server in the first embodiment, this limitation can be performed on the broadband access server (BAS) 10. The second embodiment of the invention is characterized in that a user management table 33 is formed in the memory 22 of the BAS 10 and the processor 20 executes a routine for managing the number of connections 34 prepared in the memory 21, as indicated by the dotted blocks in FIG. 2.

The user management table 33 equipped in the BAS 10 is the same as the user management table 56 shown in FIG. 5, with the exception of that the password 563 and IP address 564 columns are eliminated from the table. In the second embodiment, the user management table 56 equipped in the authentication server 40 does not need to have the columns of IP address 564, preferential MAC address 565, maximum number of connections 567, and current number of connections 568.

Figure 10:
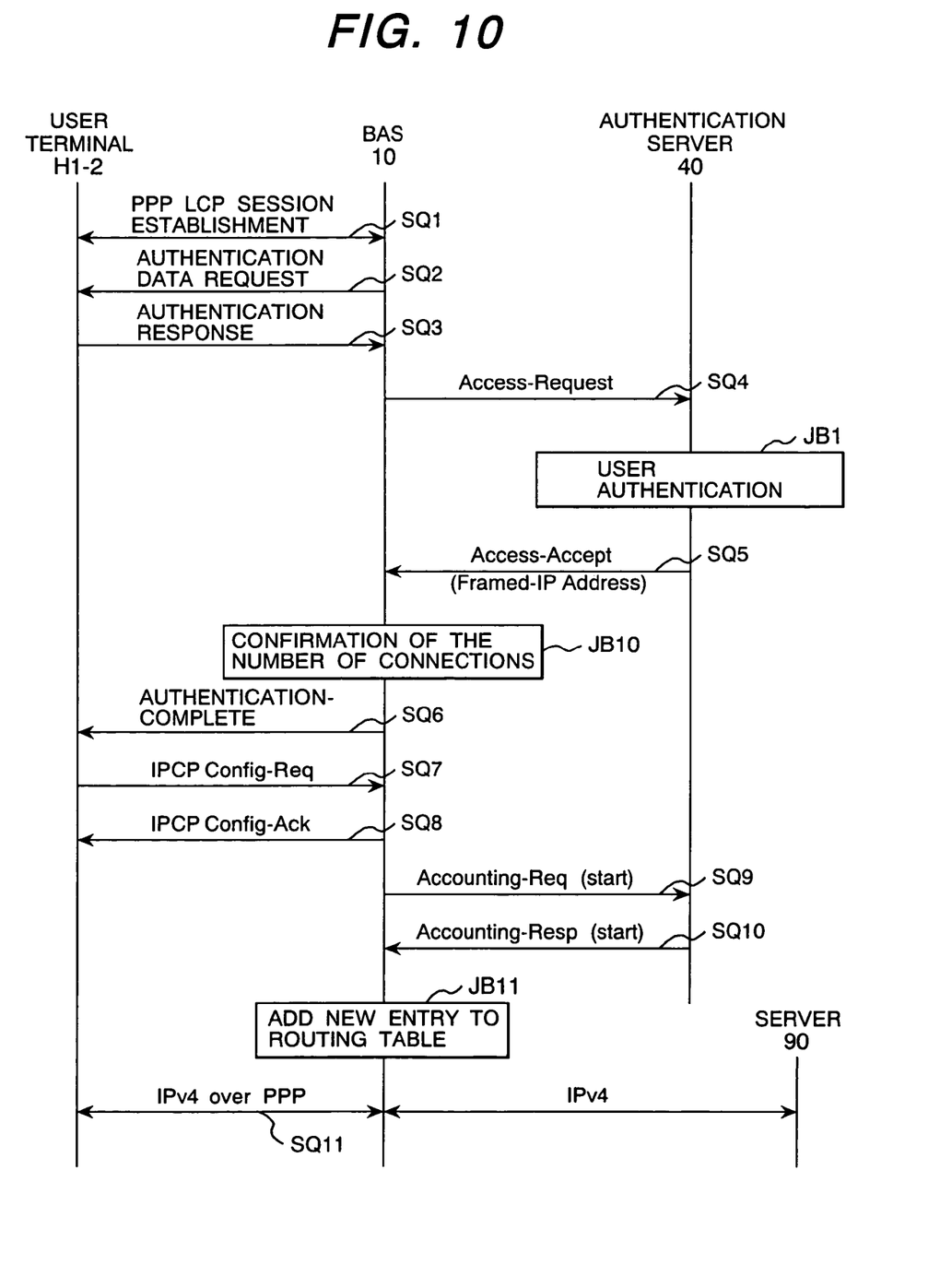
FIG. 10 shows a second embodiment of a communication sequence that is initiated when a request for connection to the Internet is issued from the user terminal to the BAS.

FIG. 10 shows a connection sequence of the second embodiment.

Since the communication procedures SQ1 to SQ10 performed between the user terminal H1-2 and the BAS 10 or between the BAS 10 and the authentication server 40 are the same as the sequence for the first embodiment shown in FIG. 6, their detailed explanation will be omitted here.

Upon receiving an access request message "Access-Request" including, for example, the user ID "user1-2@isp1" and password PW "user1" from the BAS 10, the authentication server searches the user management table 56 for a table entry corresponding to the user ID "user1-2@isp1" indicated in the received message and compares the password given in the received message with the password 563 previously registered in the table entry (user authentication JB1). When a password match occurs, the authentication server 40 retrieves an idle IP address to be assigned to the user terminal H1-2 from the IP address pool 55 and transmits an access request response message "Access-Response" including the retrieved IP address to the BAS 10 (SQ5).

In the second embodiment, the BAS 10 having received the access request response message "Access-Response" from the authentication server 40, executes the processing for confirming the number of connections (JB10) by referring to the user management table 33. If the current number of connections is less than the maximum number of connections for the group to which the user ID belongs, or if the user terminal is registered as a preferential terminal, the BAS 10 transmits an authentication complete message to the requester user terminal H1-2. Otherwise, the BAS 10 transmits an authentication failure message to the user terminal (SQ6).

Figure 11:
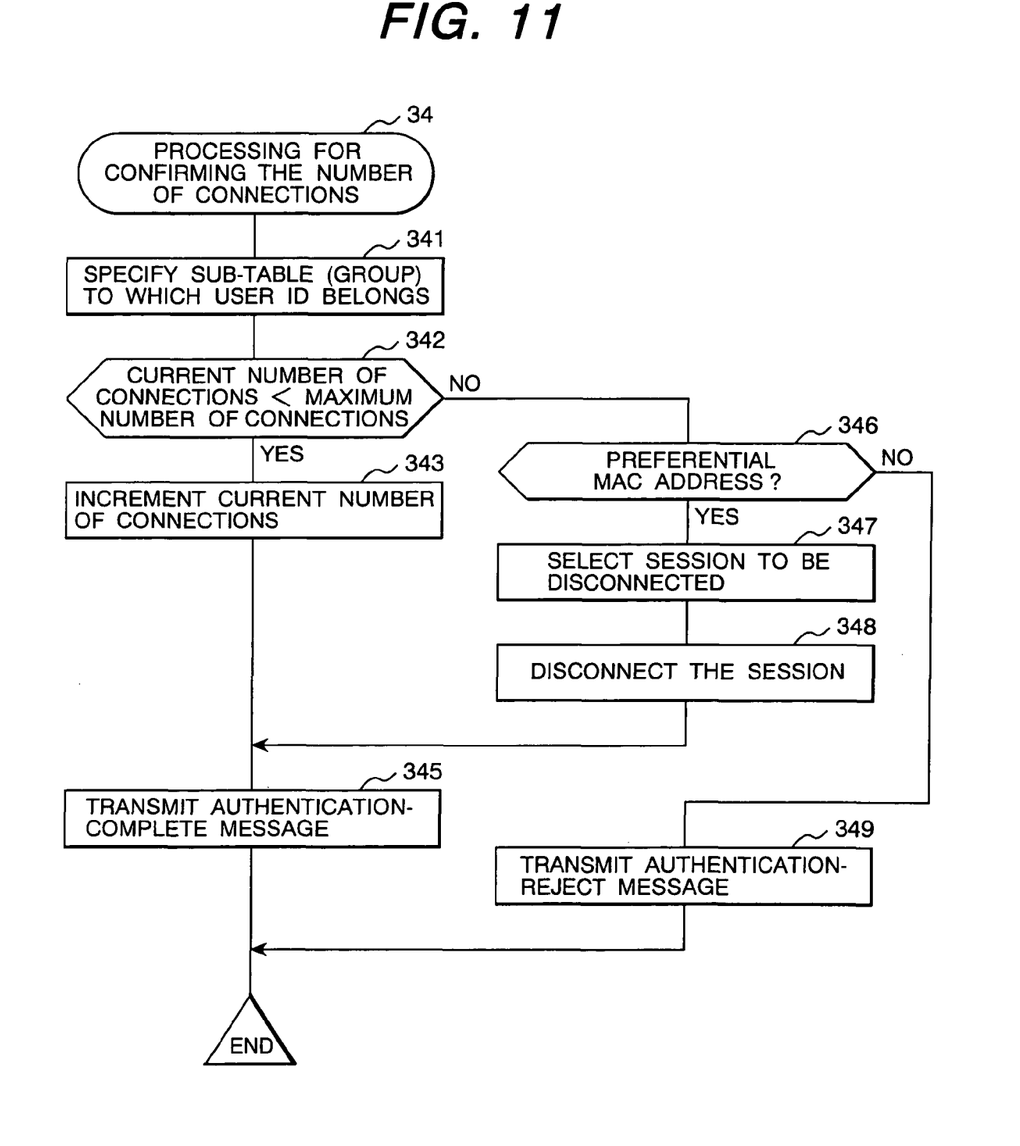
FIG. 11 is a flowchart illustrating an embodiment of processing for confirming the number of connections 34, which is performed by the BAS.

FIG. 11 shows a flowchart of the processing for confirming the number of connections (JB10) to be performed by the processor 20 of the BAS 10.

In similar to the case for the first embodiment, the processor 20 refers to the user management table 33 using the user ID of the access-requester as a search key and specifies a subtable (a subtable 560-1 in this example) to which the user ID belongs (step 341). The processor 20 compares the value of the current number of connections 568 and the value Max (1) of the maximum number of connections 567 indicated in the subtable (step 342).

If the value of the current number of connections 568 is smaller than the value Max(1) of the maximum number of connections 567, the processor 20 increments the current number of connections 568 by one (step 343) and transmits an authentication complete message to the user terminal H1-2 (step 345, SQ6 in FIG. 11).

If the current number of connections 568 has reached the maximum number of connections 567, the processor 20 checks whether the MAC address of the user terminal matches the preferential MAC address 565 registered in the above subtable (step 346). If the MAC address of the user terminal is not registered as the preferential MAC address, the processor 20 generates a response message "Access-Reject" indicating authentication failure and transmits the response message to the user terminal H1-2 (step 349, SQ6 in FIG. 11).

If the MAC address of the user terminal is registered as the preferential MAC address, the processor 41 selects a user ID whose session should be disconnected forcibly from among the user IDs associated with PPP sessions having been established and belonging to the same group (step 347). The processor 20 disconnects the session for the selected user ID (step 348) and executes step 345. In similar to the case for the first embodiment, the selection of PPP session to be disconnected is not restrictive. For example, a session having the longest intermissions in communication with a server 90 at the time or a session smallest in the total number of communication packets may be disconnected.

Figure 12:
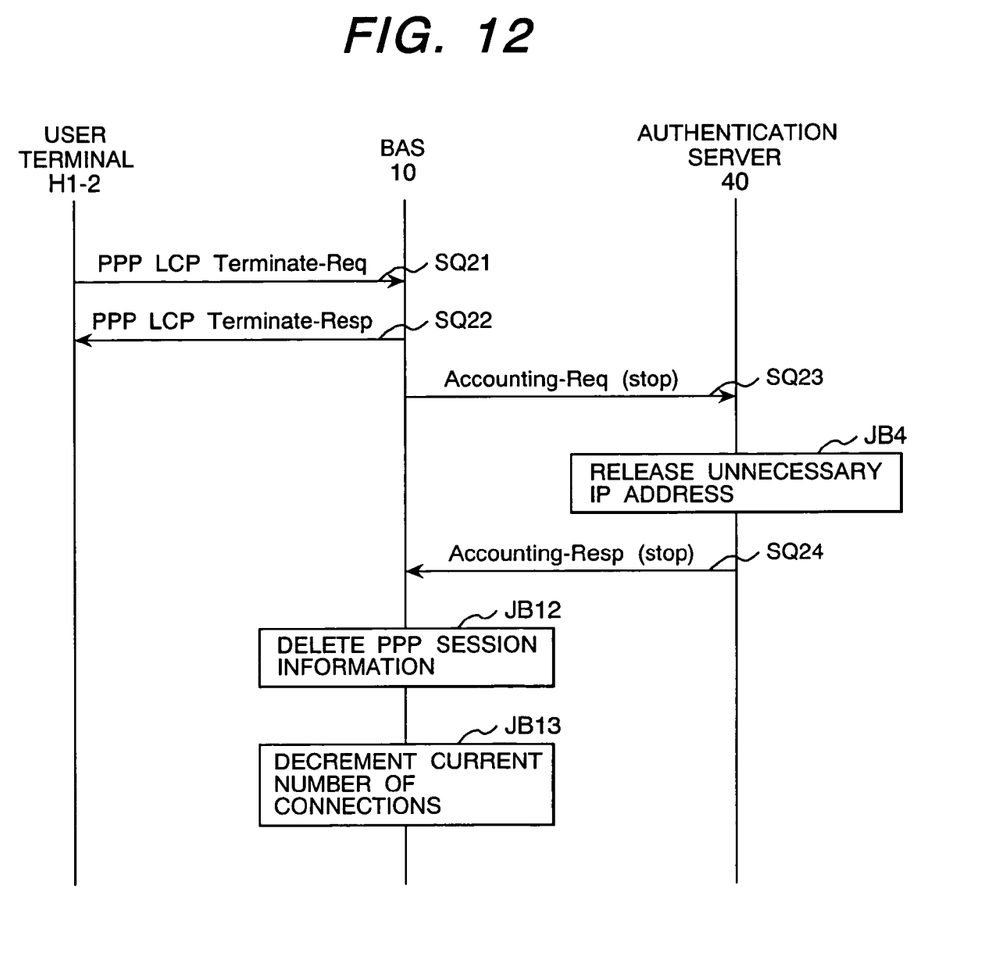
FIG. 12 shows a second embodiment of a communication sequence that is initiated when a disconnection request is issued from the user terminal to the BAS.

FIG. 12 shows a PPP session disconnection process in the second embodiment.

Since the communication procedures SQ21 to SQ24 performed between the user terminal H1-2 and the BAS 10 or between the BAS 10 and the authentication server 40 are the same as the sequence for the first embodiment shown in FIG. 9, their detailed explanation will be omitted here.

Upon receiving an accounting stop request message "Accounting-Request (stop)" from the BAS 10 (SQ23), the authentication server 40 releases the IP address registered in association with the specified user ID in the user management table 56 back to the address pool 44 (JB4) and transmits an accounting stop response message "Accounting-Response (stop)" to the BAS 10 (SQ24).

Upon receiving the accounting stop response message from the authentication server 40, the BAS 10 deletes the information relevant to the disconnected PPP session from the routing table (JB12). The BAS 10 refers to the user management table 33 and decrements by one the value of the current number of connections 568 in the subtable to which the specified user ID belongs (JB13).

What is claimed is:

1. A user terminal connection control method in a network including a packet forwarding apparatus for connecting a plurality of user terminals to an IP network by establishing a session with each user terminal in accordance with a Point to Point Protocol (PPP), and an authentication server for performing user terminal authentication in response to an authentication request issued by said packet forwarding apparatus, said authentication server having a user management table including a plurality of subtables each prepared for each user group, respectively, each of said subtables storing user identifiers belonging to the same user group, a maximum number of connections allowed to simultaneously connect to the IP network, a current number of connections, and a preferential terminal identifier indicating a user terminal to be preferentially connected to the IP network, said method comprising:
- transmitting from said packet forwarding apparatus to said authentication server an authentication request message including a user identifier and a password notified from one of said user terminals and a user terminal identifier of the user terminal, prior to connecting a user terminal to the IP network;
- performing user authentication by said authentication server based on the user identifier and the password indicated in said authentication request message, and if the user authentication succeeds, transmitting from said authentication server to said packet forwarding apparatus an access-accept message specifying an IP address assigned to the user terminal after confirming that the current number of connections is smaller than the maximum number of connections within the user group to which the user identifier belongs, by referring to said user management table; and
- notifying from said packet forwarding apparatus, in response to an IP address request from said user terminal, the user terminal of the IP address specified in said access-accept message, wherein
- said authentication server checks said user management table to determine whether said user terminal identifier indicated in said authentication request message matches the preferential terminal identifier defined in the subtable of said user group when the current number of connections has reached the maximum number of connections for said user group,
- said authentication server selects one of sessions having been established by the other access allowed user terminals in said user group when the user terminal identifier matches the preferential terminal identifier, requests said packet forwarding apparatus to disconnect the selected session and transmits said access-accept message to said packet forwarding apparatus, and
- said authentication server transmits an access-reject message to said packet forwarding apparatus when the user terminal identifier does not match the preferential terminal identifier.

2. The user terminal connection control method according to claim 1, wherein said packet forwarding apparatus establishes said session with each user terminal in accordance with a Point to Point Protocol (PPP).

3. A user terminal connection control method in a network including a packet forwarding apparatus for connecting a plurality of user terminals to an IP network by establishing a session with each user terminal in accordance with a Point to Point Protocol (PPP), and an authentication server for performing user terminal authentication in response to an authentication request issued by said packet forwarding apparatus, said packet forwarding apparatus having a user management table including a plurality of subtables each prepared for each user group, respectively, each of said subtables storing user identifiers belonging to the same group, a maximum number of connections allowed to simultaneously connect to the IP network, a current number of connections, and a preferential terminal identifier indicating a user terminal to be preferentially connected to the IP network, said method comprising:
- transmitting from said packet forwarding apparatus to said authentication server an authentication request message including a user identifier and a password notified from one of said user terminals, prior to connecting the user terminal to the IP network;
- performing user authentication by said authentication server based on the user identifier and the password indicated in said authentication request message and transmitting an access-accept message specifying an IP address to be assigned to the user terminal to said packet forwarding apparatus when the user authentication succeeds;
- transmitting an authentication complete message from said packet forwarding apparatus having received said access-accept message to said user terminal after confirming that the current number of connections is smaller than the maximum number of connections within the user group to which the authenticated user identifier belongs, by referring to said user management table; and
- notifying from said packet forwarding apparatus, in response to an IP address request from said user terminal, the user terminal of the IP address specified in said access-accept message, wherein
- said packet forwarding apparatus checks said user management table to determine whether a user terminal identifier of said user terminal having notified said user identifier and said password matches the preferential terminal identifier defined in the subtable of said user group when the current number of connections has reached the maximum number of connections for the user group,
- said packet forwarding apparatus selects one of sessions having been established by the other access allowed user terminals in said user group when the user terminal identifier matches the preferential terminal identifier, disconnects the selected session and transmits said authentication complete message to said user terminal, and
- said packet forwarding apparatus transmits an access-reject message to said user terminal when the user terminal identifier does not matches the preferential terminal identifier.

4. The user terminal connection control method according to claim 3, wherein said packet forwarding apparatus establishes said session with each user terminal in accordance with a Point to Point Protocol (PPP).

5. An authentication server for authenticating a user terminal having requested to connect to an IP network, comprising:
- a line interface for receiving an authentication request message, which includes a user identifier, a password and a user terminal identifier, from a packet forwarding apparatus via a network, and transmitting to said packet forwarding apparatus an access-accept message or access-reject message generated depending on a result of authentication;
- a user management table including a plurality of subtables each prepared for each user group, respectively, each of said subtables storing user identifiers belonging to the same group, a maximum number of connections allowed to simultaneously connect to the IP network, a current number of connections, and a preferential terminal identifier indicating a user terminal to be preferentially connected to the IP network; and a processor for performing user authentication based on the user identifier and the password indicated in said authentication request message, wherein said processor refers to said user management table and compares the current number of connections and the maximum number of connections within the user group to which said user identifier belongs when the user authentication results in success, so that the processor transmits the access-accept message to said packet forwarding apparatus when the current number of connections is less than the maximum number of connections, and wherein said processor checks whether the user terminal identifier indicated in said authentication request message matches the preferential terminal identifier defined in the subtable of said user group when the current number of connections has reached the maximum number of connections, transmits the access-reject message to said packet forwarding apparatus when the user terminal identifier does not match the preferential terminal identifier, selects one of sessions having been established by the other access allowed user terminals in said user group when the user terminal identifier matches the preferential terminal identifier and transmits the access-accept message to said packet forwarding apparatus after requesting said packet forwarding apparatus to disconnect the selected session.

6. A packet forwarding apparatus for connecting a plurality of user terminals to an IP network by establishing a session with each user terminal in accordance with a Point to Point Protocol (PPP), comprising:

a plurality of line interfaces for connecting with communication lines;

a control unit for transmitting to an authentication server through one of said line interfaces an authentication request message including a user identifier and a password notified from one of said user terminals prior to connecting the user terminal to the IP network and for notifying said user terminal of an IP address specified in an access-accept message received from said authentication server, in response to an IP address request from the user terminal; and a processor for routing received packets among said line interfaces and said control unit, wherein said control unit is provided with:

a user management table including a plurality of subtables each prepared for each user group, respectively, each of said subtables storing user identifiers belonging to the same group, a maximum number of connections allowed to simultaneously connect to the IP network, a current number of connections, and a preferential terminal identifier indicating a user terminal to be preferentially connected to the IP network; and a connection managing routine for operating said control unit to;

compare, when an access-accept response message was received from the authentication server, the current number of connections and the maximum number of connections within the user group to which the user identifier belongs in said user management table;

transmit an authentication complete message to said user terminal when the current number of connections is smaller than the maximum number of connections;

check said user management table to determine whether a user terminal identifier of said user terminal having notified said user identifier matches the preferential terminal identifier defined in the subtable of said user group when the current number of connections has reached the maximum number of connections;

transmit an access-reject message to said user terminal when the user terminal identifier does not match the preferential terminal identifier;

select one of sessions having been established by the other access allowed user terminals in said user group when the user terminal identifier matches the preferential terminal identifier; and disconnect the selected session and transmitting the authentication complete message to said user terminal.

7. The packet forwarding apparatus according to claim 6, wherein said session is established with each user terminal in accordance with a Point to Point Protocol (PPP).

* * * * *